(12) United States Patent
Molenaar et al.

(10) Patent No.: US 6,345,659 B1
(45) Date of Patent: Feb. 12, 2002

(54) DEVICE FOR BINDING TOGETHER ONE OR MORE STALKS

(75) Inventors: Willem Herman Molenaar, Baarn; Joseph Anton Johannes Huijsmans, Aalsmeer; Ewald Groenewoud, Huizen; Paul Thomas Dirk Herman, Swifterbant, all of (NL)

(73) Assignee: Pokon & Chrysal B.V., Naarden (NL)

( * ) Notice: Subject to any disclaimer, the term of this patent is extended or adjusted under 35 U.S.C. 154(b) by 0 days.

(21) Appl. No.: 09/380,279

(22) PCT Filed: Mar. 23, 1998

(86) PCT No.: PCT/NL98/00161
§ 371 Date: Aug. 27, 1999
§ 102(e) Date: Aug. 27, 1999

(87) PCT Pub. No.: WO98/42180
PCT Pub. Date: Oct. 1, 1998

(30) Foreign Application Priority Data

Mar. 24, 1997 (NL) .............................. 1005613

(51) Int. Cl.[7] .................................................. A01G 5/02
(52) U.S. Cl. ...................... 156/484; 156/468; 156/483; 53/135.2; 53/586; 47/1.01 R
(58) Field of Search .................. 47/1.01 R; 156/483, 156/468, 484; 100/33 PB; 53/135.2, 586

(56) References Cited

U.S. PATENT DOCUMENTS

| 4,423,584 A | * | 1/1984 | Elsner | 53/586 |
| 4,432,187 A | * | 2/1984 | Elsner et al. | 53/586 |
| 4,757,667 A | * | 7/1988 | Elsner | 53/135.2 |
| 6,138,437 A | * | 10/2000 | Focke et al. | 53/135.2 |

FOREIGN PATENT DOCUMENTS

| DE | 1 189 779 | | 3/1965 |
| EP | 0 286 017 | | 10/1988 |
| JP | 9-207907 A | * | 8/1997 |
| NL | 7 705 113 | | 11/1978 |
| NL | 9 202 212 | | 7/1993 |
| NL | 9 300 091 | | 8/1994 |
| NL | 1 000 753 | | 1/1997 |

* cited by examiner

Primary Examiner—Jeff H. Aftergut
(74) Attorney, Agent, or Firm—Young & Thompson

(57) ABSTRACT

The present invention relates to a method and a device for binding together one or more stalks, such as flower stems and branches, with the aid of a binding material (30), with a further object being bound in during the binding operation, the stalks being placed next to a part of the binding material (30) which is essentially stationary during the binding operation, while a further part of the binding material (30) is wrapped around the stalks. The binding device according to the present invention is characterized in that the said further object is placed against the stationary part on the same side as the stalks, preferably before the stalks are placed against the stationary part.

4 Claims, 4 Drawing Sheets

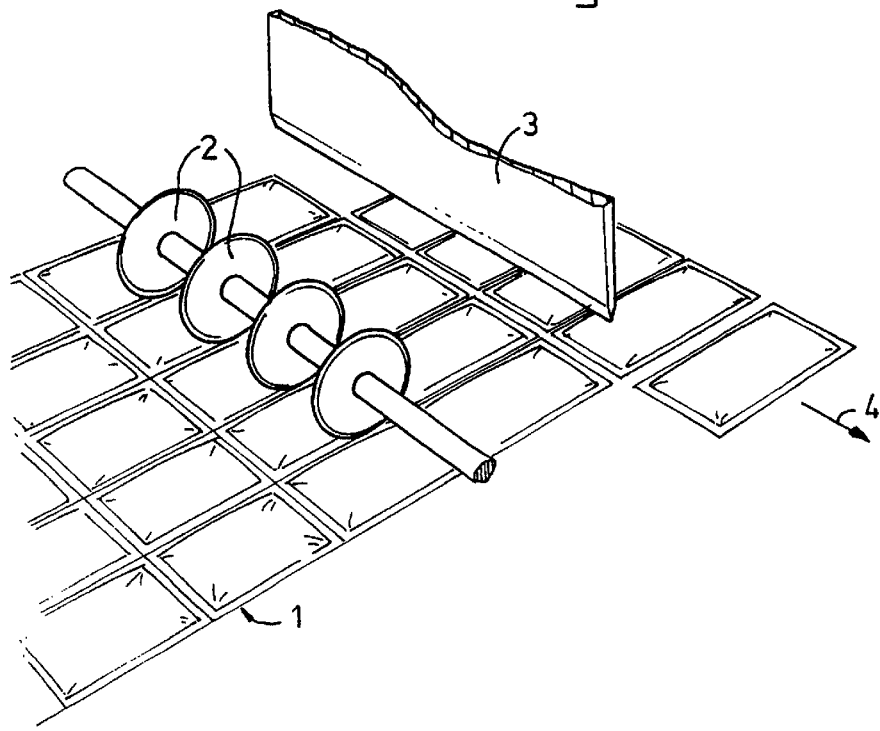
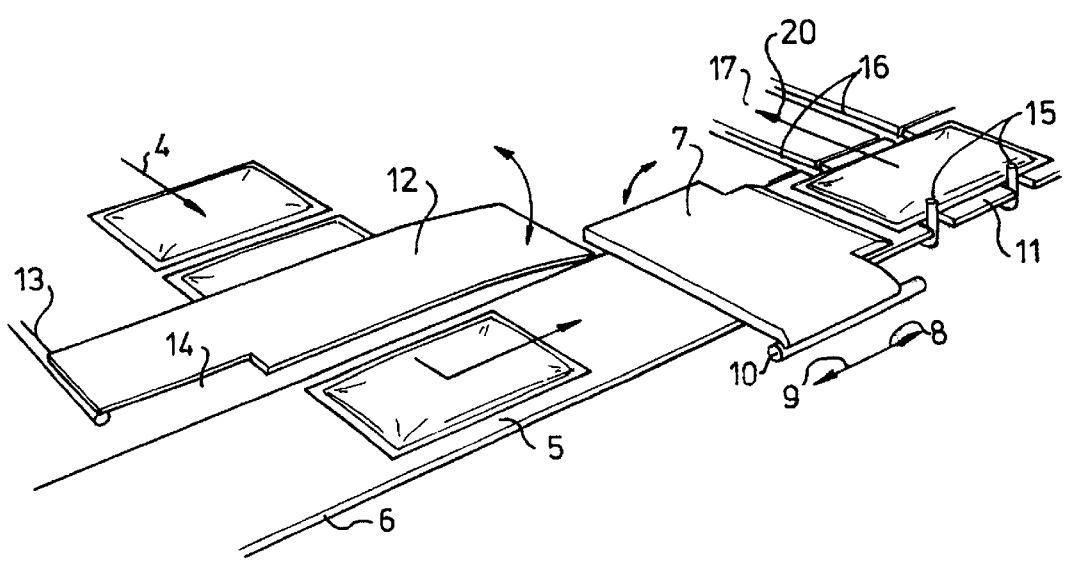

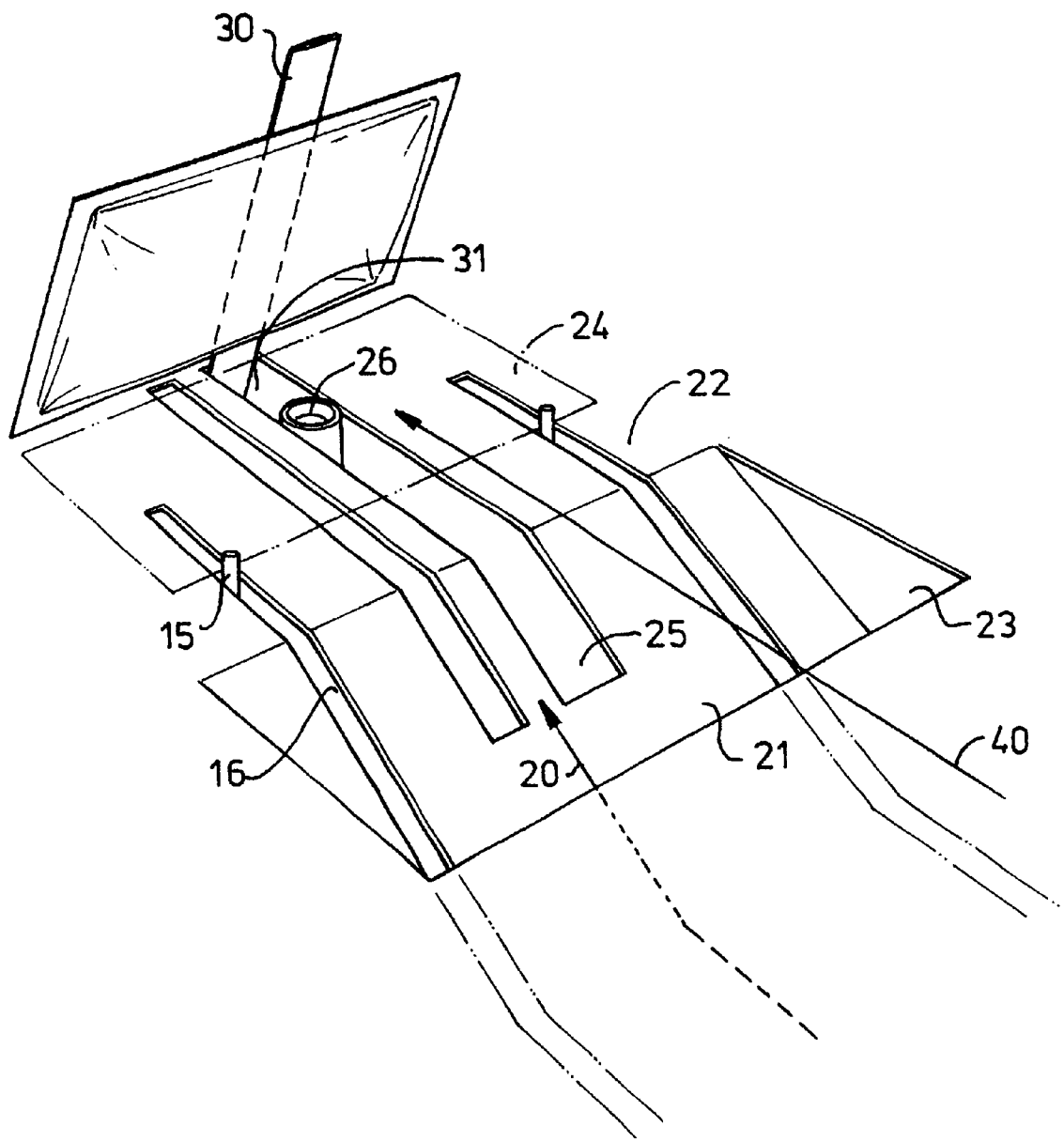

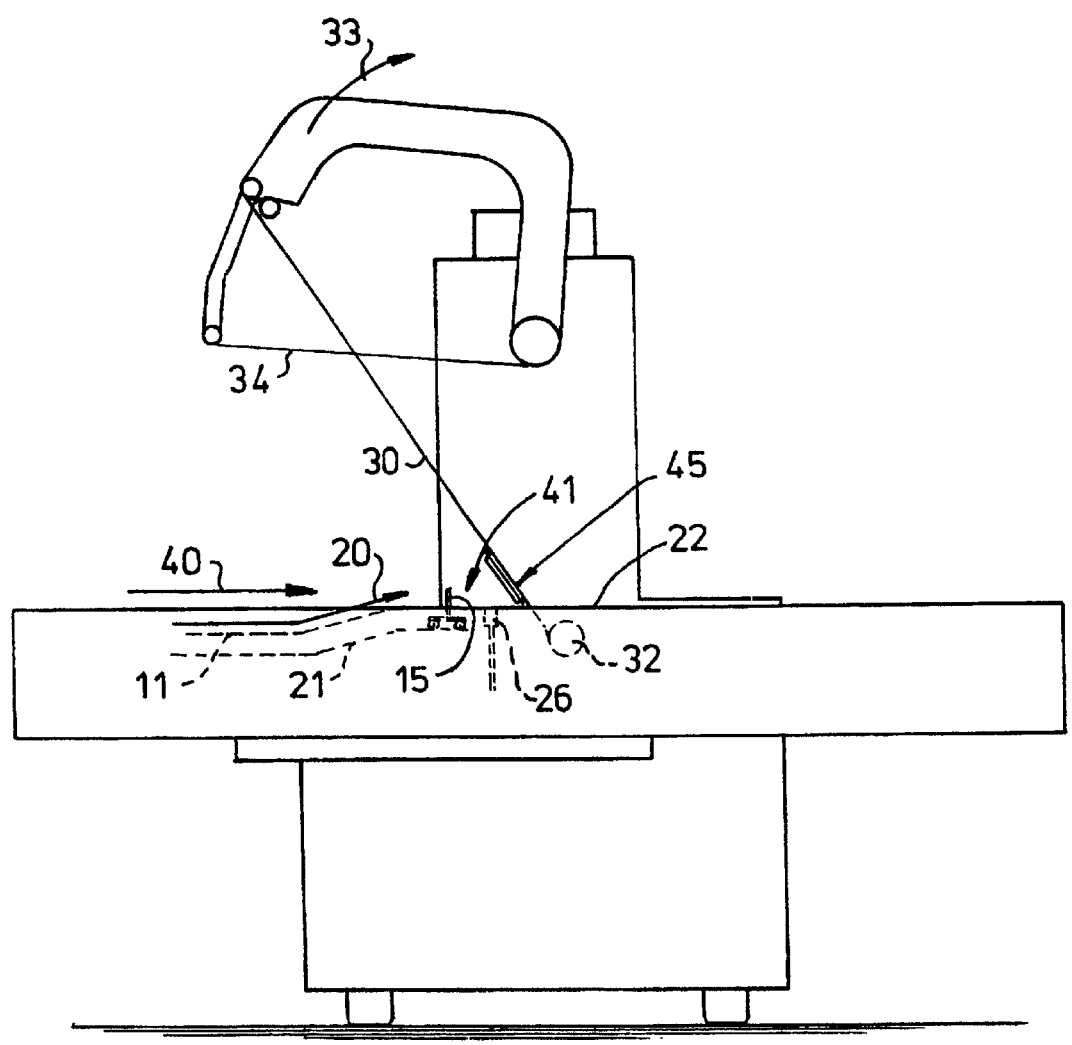

DEVICE FOR BINDING TOGETHER ONE OR MORE STALKS

The present invention relates to a method and a device for binding together one or more stalks, such as flower stems and branches, with the aid of a binding material, with a further object being bound in during the binding operation, the stalks being placed next to or against a part of the binding material which is essentially stationary during the binding operation, while a further part of the binding material is wrapped around the stalks.

A method and device of this kind are known, inter alia, from the laid-open specification NL 9202212. In the known method and device, objects, such as cut flowers, are simultaneously bound together and provided with a label. With the aid of binding material, the objects are joined in a binding region on a support. The binding material extends from one end of a binding member, which is positioned above the support and the other end of which is attached such that it can rotate, as far as a knotting mechanism, which is positioned beneath the support. The labels are fed to the binding region still attached to one another. The labels are provided with a serrated cutout. When the objects are being bound together, the binding member swings partially around the objects, thus passing through the plane of the support. In so doing, the binding material is pulled, in the region of the end of the binding member, into the serrated cutout provided in the label. When the binding material is pulled taut, the label is pulled off the following labels along a tear line.

Since the labels are joined to that section of the binding material which passes the support, there is a risk that, when the binding material is pulled against the label, the label or even a series of labels will be pulled through the support in the binding region. This may make it necessary to stop the binding installation.

Moreover, in the method according to the prior art there is a risk of the label being damaged by the relatively high force with which the binding material is pulled against the label.

The object of the present invention is to provide a method with which, while stalks, such as flower stems and branches, are being bound together, further objects can be bound in with the said stalks, without the method having the drawbacks of the method and the device in accordance with the prior art.

This object is achieved in that the further object is placed next to or against the stationary part on the same side as the stalks, preferably before the stalks are placed against or next to the stationary part.

It is advantageous here for the said further object to be placed next to or against the said stationary part of the binding material on an essentially planar support, the binding material being wrapped around the stalks during a binding operation with the said binding material being brought into engagement on that side of the further object which faces away from the stalks.

The effect of these measures is that during the binding operation the further object is supported by the stalks which are to be bound when a force is exerted on the further object by the binding material. The binding does not entail any risk of the further object being pulled through the support. Moreover, the risk of the further object being damaged during the binding operation decreases. In other words: this measure also allows the binding of further objects which are relatively susceptible to damage.

In the method and the device in accordance with the laid-open specification NL 9202212, the further objects (labels) are moved towards the binding region while they are still attached to one another. The first of a series of labels is always joined to the binding material, and this label is pulled off the following labels. This pulling-off operation requires a relatively high force, entailing the risk of a label or a series of labels at the binding region being pulled through the support. This may make it necessary to stop the binding installation. Moreover, a faulty tear line between the front label and the following labels will only come to light at the delivery location during the binding operation. If the front label cannot be pulled off the following labels, there is no longer any time to intervene in order to prevent the binding installation from having to be shut down.

It is therefore desirable for the said further object to be fed individually, with the aid of feed means, until it is close to or next to the said binding material.

This has the advantage that the further objects can be fed separately from one another, for example one by one. Owing to the feed means, it is no longer necessary for the further objects to be pushed forwards by following further objects.

Furthermore, in the method and the device in accordance with the abovementioned Dutch laid-open specification 9202212, the labels are joined to the binding material form-fit, only relatively insecurely. This means that the label itself will have to be relatively stiff in order to ensure a good join between the labels and the binding material. Soft, flat or thin labels, with a relatively low to very limited stiffness, cannot be joined to a binding material using the method in accordance with the laid-open specification. Moreover, the labels have to be positioned accurately in order to ensure a join between the labels and the binding material.

It is therefore possible according to the invention for the binding material to be elastic.

It is also possible according to the invention for the said binding material to be an adhesive tape, which is preferably bound around the stalk-like objects with the adhesive side facing towards the stalk-like objects, the further object preferably being adhesively joined to the stationary part of the binding material.

These measures allow the further object to be pressed against the stalks by the elastic action of the elastic or to be adhesively joined to the stalks by the adhesive action of the adhesive tape. When positioning the further object, there is a certain margin when placing the said object on the binding location. By using elastic, it is sufficient for the binding material to be wrapped around the further object. When using adhesive tape, it is sufficient for the further objects to contact the binding material. It is not necessary for the binding material to engage on the further object at a specific location.

Moreover, the further object is not joined to the binding material in a precise position. As a result, the limitations placed on the shape and material of the further object are much reduced by comparison with the method according to the prior art. Even relatively thin, soft and delicate objects can be bound by this measure.

A further advantage when using adhesive tape is that the adhesive agents which are present on the binding material can be used both to join the stalks and to fix on the further object. This means that the same adhesive agent can be used to perform two functions.

Furthermore, it is possible according to the present invention for the said further object to be pressed against the binding material from a delivery location, preferably to be pressed against the adhesive side of the said adhesive tape with the aid of compressed air.

As a result, the further object is moved mechanically towards the binding material, resulting in a certain level of joining between the further object and the binding material as a result of the adhesive agent present on the binding material. To achieve a successful binding operation, it is sufficient to manipulate the binding material with the further object attached to it.

By using compressed air, it is not necessary for the attachment means to have moving mechanical components. Using the compressed air, the further object which is positioned at the correct spot can be bound to the binding material in an efficient and reliable manner. Even in the absence of adhesive agents, for example if elastic is used, the further object can still be pressed against the binding material by means of the compressed air before the stalks are placed next to it.

Furthermore, the possibilities for the method and the device according to the prior art are limited to joining a label to the stalks to be bound. A number of small objects or, for example, powders cannot be bound in with the stalks.

It is therefore advantageous in the present method for the said further object to be a sachet. In this context, the word sachet is intended to mean a small bag or some other suitable container.

This has the advantage that a number of small objects or, for example, powders in the sachet can be bound in with the stalks.

The present method is suitable in particular for binding stalks, such as flower stems and branches. It is advantageous to the shelf life of the said flower stems or branches if food for the said flowers or the said branches is also supplied when they are purchased.

For this reason, the method is improved even further if the said sachet is filled with food for flowers or plants. If, in the method according to the present invention, the further object can be filled with food of this kind, this has the advantage that during a binding operation the stalks are provided with a sachet with, for example, advertising information or characteristics of the stalks which have been bound together, on its outside and the food which is important for the shelf life of the flowers and branches bound together on the inside of the sachet.

The present invention also relates to the device for carrying out the method according to the present invention. This device comprises:
- a support for the stalks to be bound,
- a closure mechanism arranged on one side of the support,
- a wrapping mechanism, which is arranged on the opposite, other side of the support, for wrapping binding material around the stalks to be bound, which binding material extends from the closure mechanism, via a passage location in the support, to the wrapping mechanism, and
- feed means for feeding, for example one by one, an object which is also to be bound in, to a delivery location which lies in a binding region, and according to the invention is characterized in particular in that the delivery location lies upstream of and next to the passage location.

As a result, during the binding operation the further object is moved onwards by the binding material towards the stalks to be bound and is supported by the stalks during the binding operation, and in addition the binding material is less prone to damaging the further object.

The device according to the present invention is improved even further by the fact that the feed means for feeding the further objects comprise a feed path which runs in the downstream direction and ends at the delivery location.

This has the advantage that the further objects are fed precisely into the binding region at the delivery location, to which the objects to be joined and the binding material are also fed.

It is desirable for the said feed path to be placed essentially at an incline and to extend between a plane which is situated at a lower level than the plane of the support and the delivery location into the plane of the support, the said feed means comprising a first conveyor belt and one or more pivotable gripper members, the said gripper members being designed to grip firmly a further object placed on the conveyor belt, and to deliver the said further object to the said delivery location by pivoting the said member, via the feed path.

In this case, it is advantageous if the device comprises one or more stationary gripper members which are designed to temporarily grip firmly a further object which is placed on the conveyor belt.

The effect of these measures is that the further objects can be positioned in a very controlled manner. The further objects are supplied with the aid of the conveyor belt and are clamped by the stationary gripper member and then released. Since the speed of the conveyor belt is known, the position of the sachet after it has been released onto the conveyor belt downstream of the gripper member is known. The pivoting movement of the pivotable gripper member can then be matched to the feed rate of further objects along the conveyor belt.

Furthermore, it is advantageous according to the invention if the device comprises a second conveyor belt, which is guided essentially around the first conveyor belt, in such a manner that further objects can be clamped between the two conveyor belts.

In this way, the further objects which lie on the first conveyor belt are positioned on the first conveyor belt with the aid of the second conveyor belt. This prevents further objects from being able to fall or slide off the conveyor belt or become twisted or move in some other way.

According to the invention, it is possible for the device to be a binding device which uses elastic as the binding material. Elastic is easy to manipulate, so that the material is easy to knot.

Moreover, it is possible for the said feed means, for the purpose of feeding the further object, to comprise a pusher member, a flat plate and a lifting member, the said pusher member being movably attached to a guide rail, in such a manner that the pusher member can be moved over the plate in a feed direction and a return direction, the lifting member being pivotably attached to a rotation pin which is positioned essentially transversely to the direction of movement of the pusher member, in such a manner that the pusher member passes over the top side of the lifting member in the return direction and passes under the bottom side of the lifting member in the feed direction.

The lifting member and the possibility of lifting the pusher member over the waiting further object increase the flexibility of feed of further objects considerably.

It is also possible for the pusher member to be pivotable about the pivot pin. Moreover, it is possible according to the invention for the said feed means to comprise a carrier component, such as a carriage, and a path which is positioned at an incline and extends from an interim storage position which is at a lower position than the plane of the support and the delivery location into the plane of the support, and the said carrier component moving the said further object onwards, from the said interim storage position, over the said path which is positioned at an incline, to the delivery location.

This has the advantage that the further objects are fed along a level which lies below the level of the support. The further objects are moved up to the level of the support only just before the binding location. This means that the further objects and the stalks to be joined can be fed via the same feed direction, towards the binding region, without there being any risk of the supply of stalks to be bound and the supply of the further objects becoming entangled with one another.

It is possible according to the present invention for the binding device to be an adhesive-tape binding device, which uses adhesive tape as the binding material, and for the adhesive side of that part of the adhesive tape which, in the starting position of the wrapping mechanism, runs from the closure mechanism to the wrapping mechanism to face upstream.

This has the advantage that the further objects which are fed by the feed means for feeding the further objects to the delivery location can be placed against the adhesive side of that part of the adhesive tape which runs through the passage location. This means that the said binding material can serve as a stop during the feed of the further objects.

In an advantageous embodiment of the present invention, the said binding device is provided with means for pressing the said further object against the adhesive tape on or from the said delivery location.

The presence of these means has the advantage that the further object is joined to the adhesive tape not at random but rather in a specific position.

In an advantageous embodiment, the said means comprise a compressed-air device. This is advantageous because the compressed-air device can press the further objects against the binding material in an efficient, inexpensive and relatively simple manner which will result in an adhesive bond if adhesive tape is used as the binding material.

Moreover, it is desirable for the device according to the present invention to comprise control means, such as microprocessors, the said control means being designed to feed a further object whenever the wrapping mechanism moves into its initial position. This means that the control means are used to adjust the speed and intervals at which the stalks to be joined and the further objects are fed.

As indicated earlier, it is repeated once again that the present invention also relates to a method and a device for binding together one or more stalks, such as cut flowers and branches, with the aid of a binding material, the stalks being provided, during the binding operation, with a further object, which is attached to the binding material before the binding operation, the said further object being attached to the binding material with the aid of adhesive agent which is attached to the binding material.

It will furthermore be clear that the term stalk or stalks which has been used should be interpreted broadly as comprising any object which can be bundled together, such as in particular an elongate object.

The invention will be explained in more detail with reference to the following figures, in which:

FIG. 1 shows how the further objects are separated by cutting;

FIG. 2 shows the feed means for the further objects;

FIG. 3 shows the binding region on the support;

FIG. 4 is a side view of a binding device according to the present invention.

Figure 5:
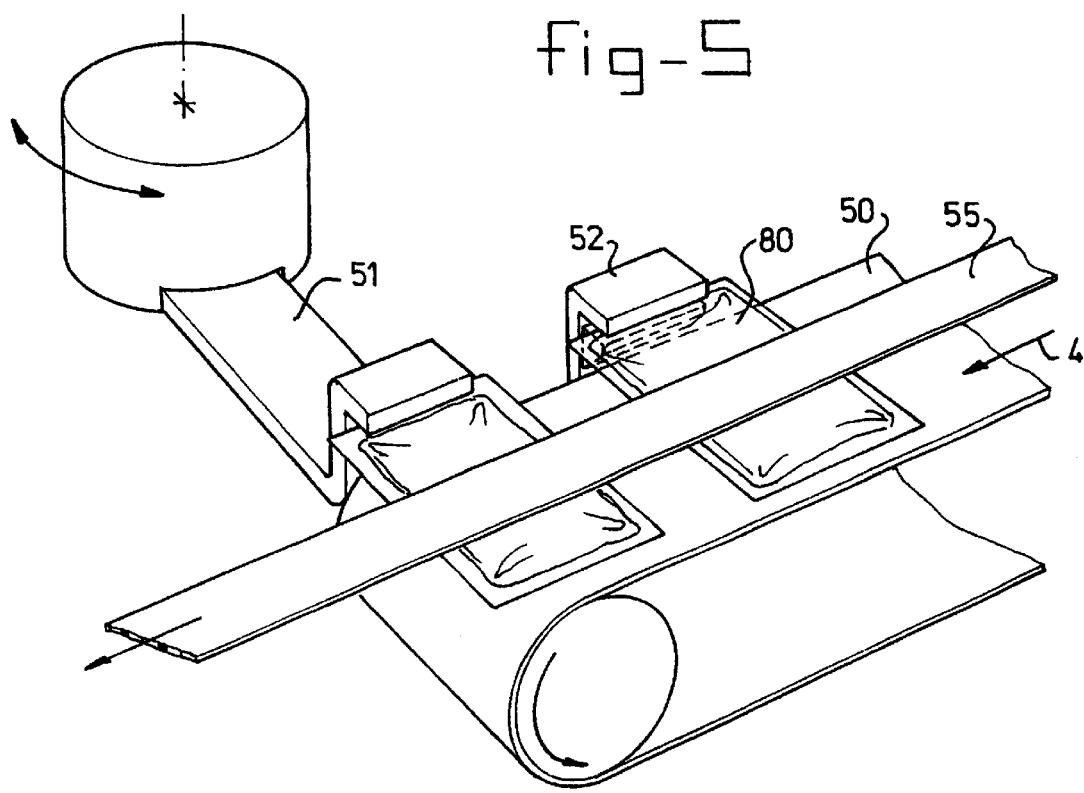
FIGS. 5 and 6 show alternative feed means for the further objects.

Referring now to FIG. 1, in a preferred embodiment of the method and device according to the present invention, further objects, such as sachets 80 or bags containing food for plants and/or flowers are fed in the form of a mat 1. The sachets are severed from one another by cutting in the longitudinal direction with the aid of cutting wheels 2 and in the transverse direction by means of a blade 3 which is positioned transversely to the feed direction of the sachets. The mat 1 is fed longitudinally in steps, so that the sachets can be separated in steps by the blade 3. After the sachets have been separated from one another both in the longitudinal direction and in the transverse direction in this way, the sachets are removed in the direction of arrow 4, transversely to the feed direction of the mat 1. This is carried out, for example, with the aid of a conveyor belt.

FIG. 2 shows a first embodiment for removing the sachets in the direction of the arrow 4. The sachets are fed to a first interim storage location 5, on a plate 6. The sachets are moved along the plate 6 with the aid of a pusher member 7. The said pusher member 7 is moved in a direction of transport (denoted by arrow 8) and in a return direction (denoted by arrow 9) via a rail (not shown), which is positioned alongside and parallel to the plate 6. The pusher member 7 is connected to this rail in such a manner that it can pivot about the pin 10. When the pusher member 7 moves in the feed direction 8, the pusher member 7 will move the sachet forwards and deliver it to a second interim storage location 11. When the pusher member 7 moves in the return direction 9, the pusher member 7 will be lifted up in the vicinity of the interim storage location 5 of the plate 6, with the aid of a lifting member 12 which can pivot about a pin 13. During this process, the pusher member 7 pivots about the pin 10, slides over the top side of the lifting member 12 and is lifted over a sachet which is waiting at the first interim storage location 5. The pusher member 7 falls back through the cutout 14 in the lifting member 12 and onto the plate 6, landing behind (in the return direction 9) the sachet which is waiting at the first interim storage location 5. The pusher member 7 can then transport the sachet from the first interim storage location 5 to the second interim storage location 11. From the second interim storage location 11, the sachet is moved further, in the direction of the arrow 20, with the aid of a carriage 15. The carriage 15 comprises two projections which can move into two recesses 16 which are arranged in the plate 6. The sachet is moved over a plate 17 in the direction 20 by means of the carriage 15.

It can be seen in FIG. 3 that the sachet is moved upwards in the direction of the arrow 20 via an inclined path 21 to the level of the support 22. The inclined path 21 lies in line with the plate 17 shown in FIG. 2. The path 21 is arranged in a recess 23 in the support 22. The carriage 15 moves the sachet onto the delivery location 24 (indicated by dashed lines) and as far as the binding material 30, which can serve as a stop. The binding material 30 is preferably an adhesive tape, but may also be a cord which is provided with an adhesive agent. The binding material 30 moves past the support 22 in the passage location 31, at the end of the groove 25. The situation in which the binding material 30 intersects the plane of the support 22 at the passage location 31 and is ready to bundle together a number of stalks is referred to as the initial position. The sachet is attached to the binding material 30 with the aid of application means, for example a compressed-air device 26. In this way, the sachet is fixed to the binding material 30. If an adhesive tape is used for the binding material 30 and its adhesive side is directed towards the sachet, the sachet will stick to the adhesive tape and the compressed-air device does not have to be continuously activated, but rather a blast of compressed air is sufficient. When the sachet has been fixed to the binding material 30 in this way, the stalks (not shown) to be bound are moved towards the binding material 30 in the direction of arrow 40.

The stalks are then joined to the binding material 30 with the sachet attached thereto.

In the present invention, the direction of the arrow 40 is the direction of flow. With the flow means downstream, while against the flow means upstream in this context.

FIG. 4 shows a side view of the binding device according to the present invention. The device comprises a support 22, on which objects, such as stalks of flowers or branches, can be joined to form a bunch or bouquet. The binding material 30 extends from an attachment means 32, which is situated below the level of the support 22, as far as the end of a pivot arm 33. The attachment means 32 forms part of a closure mechanism with which a loop of adhesive tape which has been wrapped around is closed, or with which a cord which has been wrapped around is tied into a knot, and the pivot arm 33 forms part of the wrapping mechanism with which the further part of the binding material is wrapped around the stalks. By means of the pivot arm 33, the binding material 30 can be wrapped around objects which are situated on the support 22, in the binding region 41. A pivot arm 33 of this kind is known, inter alia, from Dutch patent application 1003534 (Van den Berg Blokker B.V.). The pivot arm 33 comprises, inter alia, a flexible member 34, with which the objects to be joined are pushed together in the binding region 41 just before the binding material 30 is wrapped around the objects.

FIG. 4 shows the situation in which the sachet is joined to the binding material 30. The sachet is moved upwards with the aid of the carriage 15, in the direction of arrow 20, from a level situated below the level of the support 22. The sachet is then moved against the binding material 30 from the delivery location 24 with the aid of the compressed-air device 26, while the carriage 15 remains in the outer position. As a result, the projections on the carriage 15 accompany the first part of the pivoting movement of the sachet from the delivery location 24 to the binding material 30. The carriage 15 will then move in the opposite direction to the direction of the arrow 20, in order to pick up the next sachet.

In the position shown in FIG. 4, the binding device is ready to feed the stalks to be bound to the binding region 41. The stalks are then fed to the binding region over the support 22, in the direction of the arrow 40. Since the feed of the sachets largely takes place below the level of the feed of the stalks, there is no risk of the supply of the various products becoming entangled.

In the present invention, the sachet, as has been mentioned, is attached to the essentially stationary part of the binding material 30. The said stationary part is that section of the binding material 30 which is situated in the vicinity of the passage location 31. In the figure, the stationary part is indicated by the arrow 45.

Figure 6:
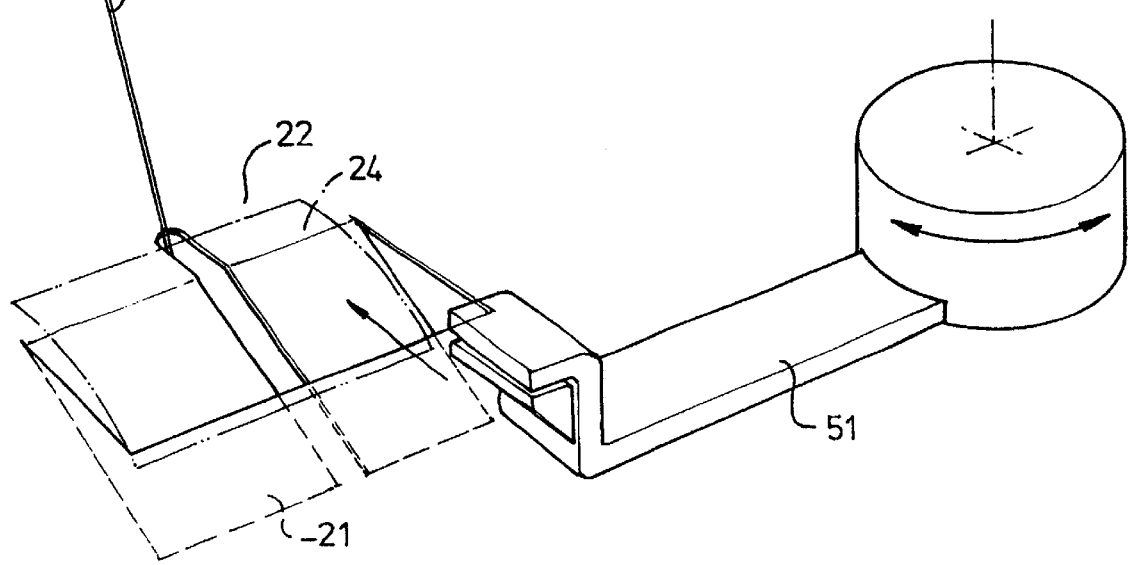

FIG. 5 shows another advantageous embodiment of feed means which can be used to transport the sachets 80 to the delivery location 24. After the sachets 80 have been separated with the aid of the cutting wheels 2 and the blade 3, the sachets 80, in the embodiment shown in FIG. 5, are moved onwards with the aid of a first conveyor belt 50. A second conveyor belt 55 is positioned around this first conveyor belt 50. This second conveyor belt 55 is positioned directly after the blade, at a specific distance above the first conveyor belt 50, so that the sachets 80 can be placed freely onto the first conveyor belt 50. At a certain distance into the direction of movement of the conveyor belts, the second conveyor belt 50 moves downwards towards the first conveyor belt 50. This enables the sachets 80 lying on the first conveyor belt 50 to be positioned in a defined position on the first conveyor belt 50, with the aid of the second conveyor belt 55, thus preventing sachets 80 from being able to fall or slide off the conveyor belt or become twisted or move in some other way. Two gripper members 51 and 52 are preferably positioned at the end of the conveyor belt 50. The sachets 80 are preferably retained with the aid of a stationary gripper member 52. After a certain time, the stationary gripper member 52 releases the further object, which as a result can move further onwards in the direction of movement of the conveyor belt 50. Since the moment of release is known, as is the speed of the conveyor belt 50, the position of the further object 80 on this section of the first conveyor belt is hence well defined. A pivotable gripper member 51 is positioned downstream of the stationary gripper member. The pivoting movement of this pivotable gripper member is matched to the feed of sachets 80 along the conveyor belt 50, which is determined by the stationary gripper member 52. Each time the stationary gripper member 52 releases a further object, the further object is gripped a short distance downstream of the said stationary gripper member by the pivotable gripper member, and with the aid of the pivotable gripper member is moved towards the delivery location 24. This pivoting movement is depicted in FIG. 6. FIG. 6 shows the pivotable gripper member 51 which has been pivoted towards the delivery location 24. Just as in the embodiment which was discussed with reference to FIG. 3, the delivery location 24 is situated on an essentially planar support 22. The delivery location 24 forms the end of a path 21 which is at an essentially inclined position. With the aid of this inclined path 21, a further object 80, which can be clamped into the pivotable gripper member 51, is moved from a plane which is situated below the plane of the support up to the plane of the support. In this way, a further object can be positioned on the delivery location 24 with the aid of the pivotable gripper member 51. It can be seen in FIG. 6 that, just as in FIG. 3, the further object 80 will be placed on the same side of the binding material 30 as the stalks which are to be bound together with the aid of the binding material 30. FIG. 6 shows the situation where the stalks and the further objects are joined with the aid of elastic 30. This elastic 30 can, for example, be bound around the stalks and the further objects with the aid of a knotting unit which is known, inter alia, from Dutch patent 1000753, which was granted on Jan. 8 1997 to Exploitatiemaatschappij Van den Berg Blokker B.V. It should be noted that any other suitable binding-material device can be used with the gripper members which are shown in FIGS. 5 and 6.

The advantage of the method and device shown in FIGS. 5 and 6 for positioning the sachets 80 on the delivery location 24 is that the pivoting member 51 is only moved into position at the moment at which the gripper member 52 releases a further object. Since the pivotable gripper member 51 clamps hold of the further object from the moment at which it is taken off the first conveyor belt 50 until it reaches the delivery location 24, its positioning on this delivery location 24 is unambiguously defined. This means that it is ensured that the sachets 80 cannot be positioned incorrectly on the delivery location 24.

What is claim:

1. Binding device for attaching binding material around one or more stalks of flower stems or branches, the binding device comprising:
   a support for the stalks to be bound,
   a closure mechanism arranged on one side of the support,
   a wrapping mechanism, which is arranged on the other side of the support, for wrapping binding material around the stalks to be bound, which binding material extends from the closure mechanism, via a passage location in the support, to the wrapping mechanism, and feed means for feeding in a feed direction a further object which is also to be bound in, to a delivery location which lies in a binding region, wherein the delivery location lies upstream of and next to the passage location, wherein feed means for feeding a further object comprise a feed path which runs in the downstream direction and ends at the delivery location, wherein the feed path (21) is placed essentially at an incline and extends between a plane which is situated at a lower level than the plane of the support (22) and the delivery location (24) into the plane of the support (22), the feed means comprising a first conveyor belt (50) and one or more pivotable gripper members (51), the gripper members (51) being designed to grip firmly a further object (80) placed on the conveyor belt (50) and to deliver the further object (80) to the delivery location (24) by pivoting the member (51) via the feed path (21).

2. Device according to claim 1, characterized in that the binding device uses elastic as the binding material (30).

3. Device according to claim 1, characterized in that the device comprises a second conveyor belt (55), which is guided essentially around the first conveyor belt (50) in such a manner that the further objects (80) can be clamped between the first and second conveyor belts (50, 55), wherein the said feed means, for the purpose of feeding the further object, comprise a pusher member (7), a flat plate (6) and a lifting member (12), the said pusher member (7) being movably attached to a guide rail, in such a manner that the pusher member (7) can be moved over the plate (6) in a feed direction (8) and a return direction (9), the lifting member (12) being pivotably attached to a rotation pin (13) which is positioned essentially transversely to the direction of movement (8, 9) of the pusher member (7), in such a manner that the pusher member (7) passes over the top side of the lifting member (12) in the return direction (9) and passes under the bottom side of the lifting member (12) in the feed direction (8), wherein the pusher member (7) is pivotable about the pivot pin (10), wherein the said feed means comprise a carrier component (15) and a path (21) which is positioned at an incline and extends from an interim storage position (11) which is at a lower position than the plane of the support (22) and the delivery location (24) into the plane of the support (22), and the said carrier component (15) moving the said further object onwards, from the said interim storage position (11), over the said path (21) which is positioned at an incline, to the delivery location (24), wherein the binding device is an adhesive-tape binding device, which uses adhesive tape as the binding material, and in that the adhesive side of that part of the adhesive tape which, in the starting position of the wrapping mechanism, runs from the closure mechanism to the wrapping mechanism faces upstream, wherein the said binding device is provided with means for pressing the said further object against the adhesive tape on or from the said delivery location and wherein the attachment means comprise a compressed-air device (26), in order to press the said further object against the binding material.

4. Device according to claim 1, characterized in that the said device comprises control means, the said control means being designed to feed a said further object whenever the wrapping mechanism moves into its initial position.

* * * * *